(12) United States Patent
Bryson et al.

(10) Patent No.: US 11,535,378 B2
(45) Date of Patent: Dec. 27, 2022

(54) TRACTABLE PENDANT ASSEMBLY FOR RESCUE HOISTS

(71) Applicant: GOODRICH CORPORATION, Charlotte, NC (US)

(72) Inventors: Richard Bryson, Yorba Linda, CA (US); Robert Humble, Brea, CA (US)

(73) Assignee: Goodrich Corporation, Charlotte, NC (US)

( * ) Notice: Subject to any disclaimer, the term of this patent is extended or adjusted under 35 U.S.C. 154(b) by 467 days.

(21) Appl. No.: 16/436,579

(22) Filed: Jun. 10, 2019

(65) Prior Publication Data

US 2020/0385120 A1 Dec. 10, 2020

(51) Int. Cl.
| | | |
|---|---|---|
| G09G 5/00 | (2006.01) |
| H04N 5/445 | (2011.01) |
| B64D 43/00 | (2006.01) |
| H04N 5/247 | (2006.01) |
| B64D 1/22 | (2006.01) |
| G06F 3/14 | (2006.01) |
| B64C 19/00 | (2006.01) |
| B64D 9/00 | (2006.01) |
| G06F 3/03 | (2006.01) |
| G02B 27/01 | (2006.01) |
| B66F 9/075 | (2006.01) |
| B66D 1/40 | (2006.01) |
| G06F 3/147 | (2006.01) |

(52) U.S. Cl.
CPC .............. *B64D 1/22* (2013.01); *B64C 19/00* (2013.01); *B64D 9/00* (2013.01); *B66D 1/40* (2013.01); *B66F 9/07581* (2013.01); *G02B 27/017* (2013.01); *G06F 3/03* (2013.01); *G06F 3/14* (2013.01); *G06F 3/147* (2013.01)

(58) Field of Classification Search
CPC ................................ B64D 1/22; B64D 45/00
See application file for complete search history.

(56) References Cited

U.S. PATENT DOCUMENTS

| | | | |
|---|---|---|---|
| 10,227,753 B2 | 3/2019 | Robertson et al. |
| 2008/0128668 A1 | 6/2008 | Fofonoff et al. |
| 2011/0089388 A1* | 4/2011 | Kiova ..................... B66C 13/04 |
| | | | 254/267 |
| 2015/0090946 A1 | 4/2015 | Schwaiger |
| 2016/0009393 A1* | 1/2016 | Repp ........................ B64D 1/22 |
| | | | 701/34.4 |
| 2018/0244507 A1 | 8/2018 | Haley et al. |
| 2019/0337641 A1* | 11/2019 | Blanton ................ G06K 9/0063 |
| 2020/0115065 A1* | 4/2020 | Ando ..................... B64C 29/00 |

\* cited by examiner

*Primary Examiner* — Nan-Ying Yang
(74) *Attorney, Agent, or Firm* — Snell & Wilmer L.L.P.

(57) ABSTRACT

A pendant assembly for a rescue hoist may comprise a pendant, an interface box discrete from the pendant, and a display screen discrete from the pendant. The pendant may include a hoist input. The interface box may be configured to receive a control input from the pendant. The display screen may be configured to receive a display command from the interface box.

17 Claims, 3 Drawing Sheets

TRACTABLE PENDANT ASSEMBLY FOR RESCUE HOISTS

FIELD

The present disclosure relates to rescue hoists, and more specifically, to a tractable pendant assembly for a rescue hoist.

BACKGROUND

Hoists used in rescue or similar operations typically wind or unwind a cable in order to raise or lower persons or cargo from a flying platform. For example, a rescue hoist may be mounted to a frame or support structure of an aircraft, such as, for example, a helicopter. The rescue hoist may include a cable drum to which the cable is attached. The cable drum rotates in one direction to spool the cable onto the drum and in the other direction to spool the cable off the drum, with one end of the cable attached to the cable drum and the other end, which may include a hook or other device, freely deployed. An operator may control the hoist using a hand held pendant. Current pendants tend to be large, heavy structures, which include one or more control switches and a display screen located on a large rectangular component supported by a handle. To view the display screen, a pendant operator tends to take his/her eyes off the load, thereby putting the load and/or the aircraft at risk.

SUMMARY

A pendant assembly for a rescue hoist is disclosed herein. In accordance with various embodiments, the pendant assembly may comprise a pendant including a hoist input, an interface box discrete from the pendant, and a display screen discrete from the pendant. The interface box may be configured to receive a control input from the pendant. The display screen may be configured to receive a display command from the interface box.

In various embodiments, the pendant assembly may further comprise a visor. The display screen may be mounted to the visor. In various embodiments, the display screen may be configured to display data corresponding to an operating state of the rescue hoist.

In various embodiments, the hoist input may comprise at least one of a push button, a toggle switch, a wheel, a joy stick, or a touch pad.

In various embodiments, the pendant may further comprise an auxiliary input. The auxiliary input may comprise at least one of a push button, a toggle switch, a wheel, a joy stick, or a touch pad.

In various embodiments, the pendant may comprise a cylindrical shaped housing. In various embodiments, the hoist input and the auxiliary input may be located proximate opposing sides of the pendant.

In various embodiments, an electrical conduit may be coupled between the pendant and an input-output port of the interface box. The input-output port may comprise at least one of a Universal Serial Bus port or an Ethernet port.

A hoist and rescue system for an aircraft is also disclosed herein. In accordance with various embodiments, the hoist and rescue system may comprise a hoist and a pendant assembly configured to control the hoist. The pendant assembly may comprise a pendant including a hoist input, an interface box configured to receive a control input from the pendant, and a display screen discrete from the pendant and configured to receive a display command from the interface box.

In various embodiments, the hoist and rescue system may further comprise a helmet including a visor. The display screen may be mounted to the visor. In various embodiments, the pendant may further comprise an auxiliary input. In various embodiments, the hoist and rescue system may further comprise at least one of a search light or a hoist support. The auxiliary input may be configured to control the at least one of the search light or the hoist support.

In various embodiments, the hoist input may be located at first side of the pendant and the auxiliary input may be located at a second side of the pendant opposite the first side. In various embodiments, the auxiliary input may be configured to control a positioning of the aircraft.

In various embodiments, the display screen may be wirelessly connected the interface box. In various embodiments, a control module may be in operable communication with the interface box and the hoist. The control module may be configured to receive an input signal from the interface box and output a command signal to the hoist.

A pendant assembly for a rescue hoist is also disclosed herein. In accordance with various embodiments, the pendant assembly may comprise a pendant and a display screen discrete from the pendant. The pendant may include a hoist input. The pendant may be configured to display data corresponding to an operating state of the rescue hoist.

In various embodiments, the pendant assembly may further comprise a helmet including a visor. The display screen may be mounted to the visor.

In various embodiments, the pendant may further comprise an auxiliary input. In various embodiments, the hoist input may be located at first side of the pendant and the auxiliary input may be located at a second side of the pendant opposite the first side.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A pendant assembly for controlling a rescue hoist is disclosed herein. In accordance with various embodiments, the pendant assembly may include a hand held pendant, an interface box, and a display screen. The interface box and display screen may be discrete from the hand held pendant. In various embodiments, the display screen may be coupled to an operator visor. Separating the interface box and the display screen from the hand held pendant allows a size and weight of the hand held pendant to be reduced. Additionally, locating the display screen on an operator visor tends to allow the hoist operator to view the load and the display screen simultaneously.

Figure 1:
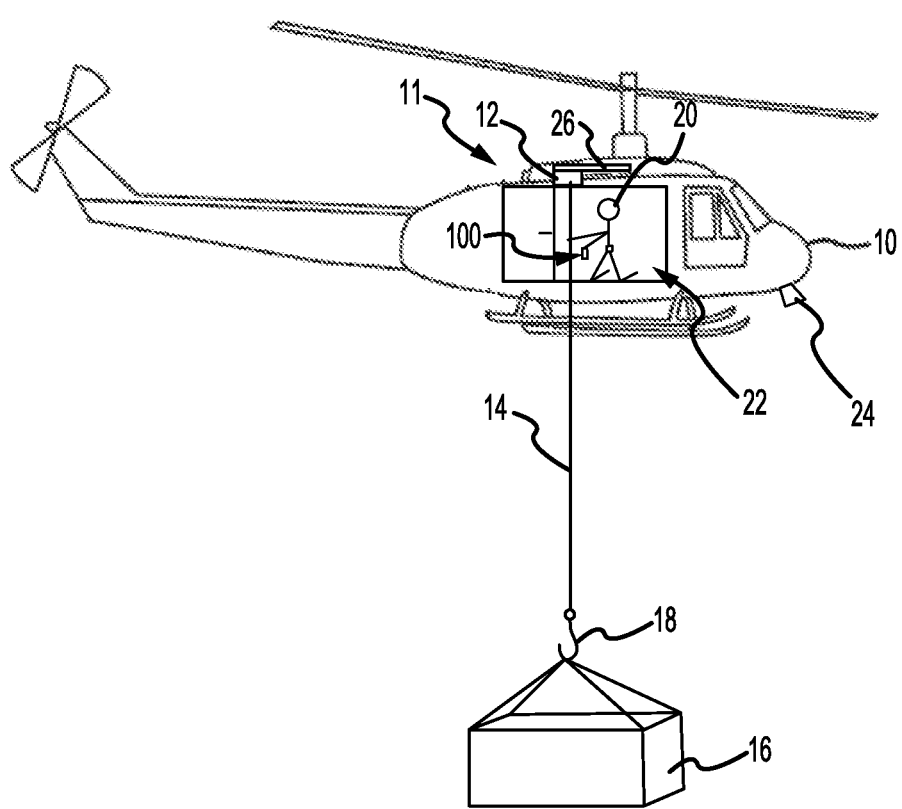
FIG. 1 illustrates an aircraft having a hoist and rescue system, in accordance with various embodiments.

Referring now to FIG. 1, an aircraft 10, such as a helicopter, is illustrated, in accordance with various embodiments. Aircraft 10 may be used for search and rescue missions. Aircraft 10 may include a hoist and rescue system 11. Hoist and rescue system 11 includes a hoist 12. Hoist 12 is attached to aircraft 10 by a support structure 26. Hoist 12 may be used to extend and/or retract (e.g., lower and/or raise, respectively) a cable 14 (e.g., a wire-rope) connected to a load 16 via a hook 18 and/or the like. In various embodiments, load 16 may be any suitable load. For example, in various embodiments, load 16 may be a person (e.g., rescue personnel being lowered from aircraft 10 and/or person(s) being rescued and lifted into aircraft 10).

A hoist operator 20 may be located in a doorway 22 of aircraft 10. In accordance with various embodiments, hoist operator 20 may control hoist 12 via a pendant assembly 100 of hoist and rescue system 11. Stated differently, pendant assembly 100 is a control device for hoist 12. In various embodiments, pendant assembly 100 may also allow hoist operator 20 to control other components of hoist and rescue system 11. For example, hoist operator 20 may control a search light 24 of hoist and rescue system 11 and/or support structure 26 using pendant assembly 100. In various embodiments, pendant assembly 100 may be configured to allow hoist operator 20 to make changes to the position (e.g., the altitude, pitch, yaw, etc.) of aircraft 10.

Figure 2A:
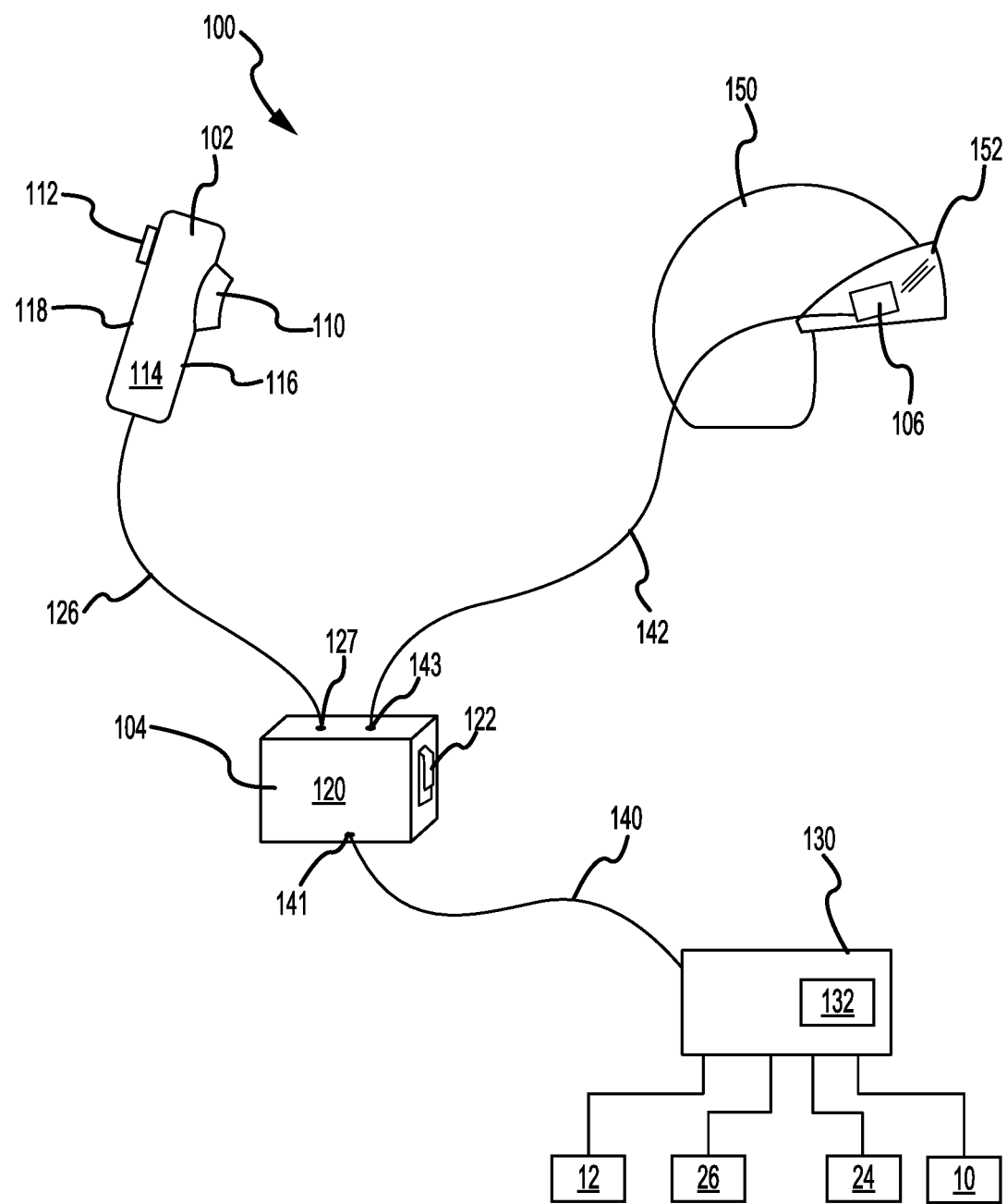
FIG. 2A illustrates a pendant assembly for a rescue hoist, in accordance with various embodiments.

Referring to FIG. 2A, and with continued reference to FIG. 1, pendant assembly 100 is illustrated. In accordance with various embodiments, pendant assembly 100 includes a pendant 102, an interface box 104, and a display screen 106. Pendant 102 includes one or more hoist input(s) 110. Hoist input 110 is configured to control operation of hoist 12. Hoist input 110 may be a push button, toggle switch, wheel, joy stick, touch pad, or the like. Hoist input 110 may be configured to stop or start the raising or lowering of cable 14. Hoist input 110 may also be configured to control the speed at which cable 14 is raised and lower. Stated differently, hoist input 110 may be configured to control (e.g., increase or decrease) the rotational speed of hoist 12 (i.e., the rotational speed of the cable drum which spools cable 14).

In various embodiments, pendant 102 includes one or more auxiliary input(s) 112. Auxiliary inputs 112 may be configured to control operation of other components of hoist and rescue system 11. For example, auxiliary inputs 112 may control search light 24, support structure 26, or any other desired component of aircraft 10. Auxiliary inputs 112 may include push buttons, toggle switches, wheels, joy sticks, touch pads, or the like. In various embodiments, at least one of the auxiliary inputs 112 is configured to control operation of support structure 26, which operation may include activating a motor disposed within or proximate support structure 26 to rotate support structure 26. In various embodiments, at least one of the auxiliary inputs 112 is configured to control operation of search light 24, which operation may include activating a motor disposed within or proximate search light 24 to rotate search light 24. In various embodiments, at least one of the auxiliary inputs 112 is configured to control a positioning of aircraft 10, which operation may include sending command signals to one or more engine or rotor controllers of aircraft 10 to adjust a positioning (e.g., the altitude, pitch, yaw, etc.) of aircraft 10.

Pendant 102 includes a housing 114. Housing 114 may comprise a metal, metal alloy, plastic, composite, or any other suitable material. In various embodiments, housing 114 may be made from aluminum. In various embodiments, housing 114 may comprise a generally cylindrical shape. In various embodiments, hoist input 110 may be located on a first side 116 of housing 114 and auxiliary inputs 112 may be located on a second side 118 of housing 114. In various embodiments, pendant 102 may be configured such that hoist operator 20 can manipulate hoist input 110 with his/her index finger while manipulating auxiliary inputs 112 with his/her thumb.

Pendant assembly 100 further includes interface box 104. Interface box 104 is discrete from pendant 102. In this regard, interface box 104 is a separate, distinct structure from pendant 102. As a discrete component, interface box 104 may be located away from pendant 102. For example, interface box 104 may be located on a belt or in a flight suit pocket of hoist operator 20, while pendant 102 is located in a hand of hoist operator 20. Interface box 104 includes a box housing 120. Box housing 120 may comprise a metal, metal alloy, plastic, composite, or any other suitable material. In various embodiments, box housing 120 may be made from aluminum. In various embodiments, box housing 120 may comprise a generally rectangular shape. In various embodiments, a clip 122 may be located on a side of box housing 120. Clip 122 may be configured to couple interface box 104 to a belt, flight suit pocket, or any other desired location on hoist operator 20.

Figure 2B:
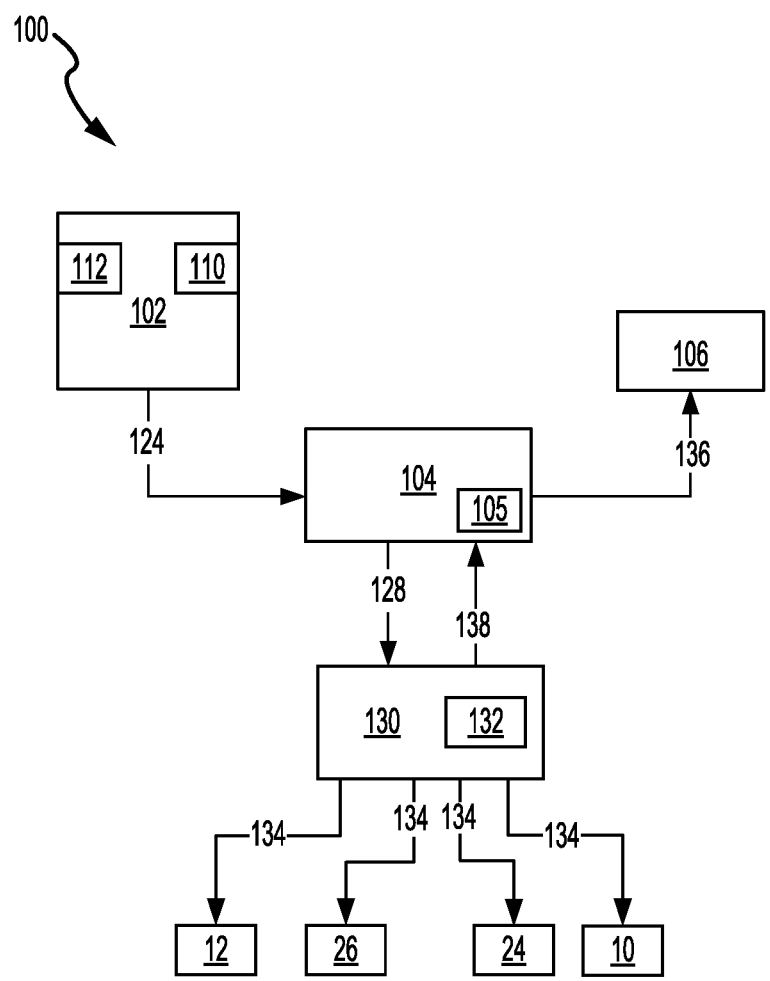
FIG. 2B illustrates a schematic of a pendant assembly for a rescue hoist, in accordance with various embodiments.

Pendant 102 is in communication with interface box 104. Stated differently, pendant 102 is operationally coupled to interface box 104. With reference to FIG. 2B, in accordance with various embodiments, interface box 104 may include and communicate with one or more processors and one or more tangible, non-transitory memories 105 and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Pendant 102 is configured to provide control inputs 124 to interface box 104 based on the positions and/or manipulations of hoist input 110 and/or of auxiliary input(s) 112. With combined reference to FIGS. 2A and 2B, in various embodiments, interface box 104 may be electrically coupled to pendant 102 via an electrical conduit 126. In this regard, control inputs 124 from pendant 102 may be transmitted to interface box 104 via electrical conduit 126. Electrical conduit 126 may be electrically engaged at an input-output port 127 of interface box 104. Input-output port 127 may be located at a side of box housing 120. Input-output port 127 may comprise a Universal Serial Bus (USB) port, an Ethernet port, or any other suitable input-output port.

In various embodiments, interface box 104 and pendant 102 may communicate via a wireless connection such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), an infrared signal, an optical signal, or any other signal capable of transmitting information wirelessly. In this regard, pendant 102 may wirelessly transmit control inputs 124 to interface box 104.

Interface box 104 may be in communication with a control module 130. Stated differently, interface box 104 is operationally coupled to control module 130. Control module 130 may include and communicate with one or more processors and one or more tangible, non-transitory memories 132 and may be capable of implementing logic. The processor can be a general purpose processor, a DSP, an ASIC, a FPGA or other programmable logic device, discrete gate or transistor logic, discrete hardware components, or a combination thereof. In various embodiments, control module 130 is a control area network (CAN) bus. In various embodiments, control module 130 may be located on aircraft 10. Control module 130 may be a standalone controller or may be incorporated into an overall controller for aircraft 10.

Referring to FIG. 2B, interface box 104 may be configured to provide input signals 128 to control module 130 based on the control inputs 124 received from pendant 102. Stated differently, upon receipt of control inputs 124 from pendant 102, interface box 104 sends input signals 128 to control module 130. Upon receipt of input signals 128 from interface box 104, control module 130 will output command signals 134 directing hoist 12, search light 24, support structure 26, and/or aircraft 10 to respond in accordance with input signal 128. For example, and with momentary additional reference to FIG. 1, hoist input 110 may be manipulated by hoist operator 20 to command hoist 12 to raise cable 14 by directing an appropriate command signal from hoist input 110 of pendant 102 to hoist 12 via interface box 104 and control module 130.

Interface box 104 may also be in communication with display screen 106. Stated differently, interface box 104 is operationally coupled to display screen 106. Interface box 104 is configured to provide display commands 136 to display screen 106. Display commands 136 may be based on control inputs 124 received from pendant 102 and/or on output signals 138 received from control module 130. Display commands 136 may correspond to an operating state of hoist 12, search light 24, support structure 26, and/or aircraft 10. For example, and with momentary additional reference to FIG. 1, display commands 136 may correlate to a mass of load 16 and/or a length of cable 14 that has been unspooled and/or a length of cable 14 still available to unspool. In various embodiment, display commands 136 may include alerts, warnings, or any other desired message. In response to receiving display commands 136, display screen 106 displays and/or manipulates an image or message on display screen 106 configured to convey data corresponding to the operating state of hoist 12 or any other desired information to hoist operator 20.

With combined reference to FIGS. 2A and 2B, in various embodiments, interface box 104 is electrically coupled to control module 130 via an electrical conduit 140. In this regard, input signals 128 from interface box 104 and output signals 138 from control module 130 may be transmitted via electrical conduit 140. Electrical conduit 140 may be electrically engaged at an input-output port 141 of interface box 104. Input-output port 141 may be located at a side of box housing 120. Input-output port 141 may comprise a USB port, an Ethernet port, a High-Definition Multimedia Interface (HDMI) port, or any other suitable input-output port.

In various embodiments, interface box 104 and control module 130 may communicate via a wireless connection such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), an infrared signal, an optical signal, or any other signal capable of transmitting information wirelessly. In this regard, interface box 104 may wirelessly transmit input signals 128 to control module 130, and control module 130 may wirelessly transmit output signals 138 to interface box 104.

In various embodiments, interface box 104 is electrically coupled to display screen 106 via an electrical conduit 142. In this regard, display commands 136 from interface box 104 may be transmitted to display screen 106 via electrical conduit 142. Electrical conduit 142 may be electrically engaged at an input-output port 143 of interface box 104. Input-output port 143 may be located at a side of box housing 120. Input-output port 143 may comprise a USB port, an Ethernet port, a HDMI port, or any other suitable input-output port.

In various embodiments, interface box 104 and display screen 106 may communicate via a wireless connection such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), an infrared signal, an optical signal, or any other signal capable of transmitting information wirelessly. In this regard, interface box 104 may wirelessly transmit display commands 136 to display screen 106.

Referring to FIG. 2A, pendant assembly 100 further includes display screen 106. Display screen 106 is mounted to a fixed structure. For example, display screen 106 may be mounted on operator helmet 150. In various embodiments, display screen 106 may be mounted to a visor (or eye cover) 152 of helmet 150. In this regard, the fixed structure may be visor 152. In various embodiments, the fixed structure may be a display mount attached to visor 152. Display screen 106 may be mounted using adhesive, fasteners, clips, or any other suitable securement device.

In various embodiments, display screen 106 may comprise a digital display. Display screen 106 may have any suitable resolution, for example 640×480 pixels, 1024×768 pixels, 1280×720 pixels, 1920×1080 pixels, 3840×2160 pixels, and/or the like. In various embodiments, display screen 106 may be configured display video images from camera attached to load 16, hook 18, search light 24, or any other component of aircraft 10.

Display screen 106 is mounted on visor 152 in a location corresponding to the field of view of an operator wearing visor 152. Display screen 106 is discrete from pendant 102. In this regard, display screen 106 is a separate, distinct structure from pendant 102. As a discrete component, display screen 106 may be located away from pendant 102. For example, display screen 106 may be located on visor 152, while pendant 102 is located in a hand of hoist operator 20. In various embodiments, visor 152 may be discrete from helmet 150, such that an operator can wear visor 152 and thus view display screen 106, without wearing helmet 150.

With combined reference to FIGS. 1 and 2A, the location of display screen 106 allows hoist operator 20 to view information relating to the operating state of hoist 12 and/or receive alerts without having to look at pendant 102. In various embodiments, pendant assembly 100 may allow hoist operator 20 to view display screen 106 and load 16 simultaneously. In this regard, pendant assembly 100 tends to provide increased safety and/or reduce risk to load 16, hoist operator 20, and/or aircraft 10.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pendant assembly for a rescue hoist, the pendant assembly comprising:
   a hand held pendant including a hoist input and a housing for locating in a hand of a hoist operator, the hoist input is configured to control a rotational speed of the rescue hoist, the hoist input comprises at least one of a push button, a toggle switch, a wheel, a joy stick, or a touch pad, wherein the hoist operator manipulates the hoist input to provide a control input;
   an interface box discrete from the hand held pendant and configured to receive the control input from the pendant;
   a display screen discrete from the pendant and configured to receive a display command from the interface box; and
   a visor, wherein the display screen is mounted to the visor, and
   wherein the display screen is disposed to allow the hoist operator to view a hoist load and the display screen simultaneously.

2. The pendant assembly of claim 1, wherein the display screen is configured to display data corresponding to an operating state of the rescue hoist.

3. The pendant assembly of claim 1, wherein the pendant further comprises an auxiliary input, the auxiliary input comprising at least one of a push button, a toggle switch, a wheel, a joy stick, or a touch pad.

4. The pendant assembly of claim 3, wherein the housing comprises a cylindrical shaped housing.

5. The pendant assembly of claim 4, wherein the hoist input and the auxiliary input are located proximate opposing sides of the pendant.

6. The pendant assembly of claim 5, further comprising an electrical conduit coupled between the pendant and an input-output port of the interface box, the input-output port comprising at least one of a Universal Serial Bus port or an Ethernet port.

7. A hoist and rescue system for an aircraft, comprising:
   a hoist; and
   a pendant assembly configured to control the hoist, the pendant assembly comprising:
      a hand held pendant including a housing for locating in a hand of a hoist operator and a hoist input, the hoist input is configured to control a rotational speed of the rescue hoist, the hoist input comprises at least one of a push button, a toggle switch, a wheel, a joy stick, or a touch pad, wherein the hoist operator manipulates the hoist input to provide a control input;

an interface box configured to receive a control input from the pendant;

a display screen discrete from the pendant and configured to receive a display command from the interface box; and a helmet including a visor, wherein the display screen is mounted to the visor, and wherein the display screen is disposed to allow the hoist operator to view a hoist load and the display screen simultaneously.

8. The hoist and rescue system of claim 7, wherein the pendant further comprises an auxiliary input.

9. The hoist and rescue system of claim 8, further comprising at least one of a search light or a hoist support, wherein the auxiliary input is configured to control the at least one of the search light or the hoist support.

10. The hoist and rescue system of claim 9, wherein the hoist input is located at first side of the pendant and the auxiliary input is located at a second side of the pendant opposite the first side.

11. The hoist and rescue system of claim 8, wherein the auxiliary input is configured to control a positioning of the aircraft.

12. The hoist and rescue system of claim 7, wherein the display screen is wirelessly connected the interface box.

13. The hoist and rescue system of claim 7, further comprising a control module in operable communication with the interface box and the hoist, wherein the control module is configured to receive an input signal from the interface box and output a command signal to the hoist.

14. A pendant assembly for a rescue hoist, the pendant assembly comprising:

a hand held pendant including a housing for locating in a hand of a hoist operator and a hoist input, the hoist input is configured to control a rotational speed of the rescue hoist, the hoist input comprises at least one of a push button, a toggle switch, a wheel, a joy stick, or a touch pad, wherein the hoist operator manipulates the hoist input to provide a control input; and a display screen discrete from the pendant and configured to display data corresponding to an operating state of the rescue hoist; and a helmet including a visor, wherein the display screen is mounted to the visor, and wherein the display screen is disposed to allow the hoist operator to view a hoist load and the display screen simultaneously.

15. The pendant assembly claim 14, wherein the pendant further comprises an auxiliary input.

16. The pendant assembly of claim 15, wherein the hoist input is located at first side of the pendant and the auxiliary input is located at a second side of the pendant opposite the first side.

17. A pendant assembly for a rescue hoist, the pendant assembly comprising:

a hand held pendant including a hoist input and a housing for locating in a hand of a hoist operator, the hoist input is configured to control a rotational speed of the rescue hoist, the hoist input comprises at least one of a push button, a toggle switch, a wheel, a joy stick, or a touch pad, wherein the hoist operator manipulates the hoist input to provide a control input;

an interface box discrete from the hand held pendant and configured to receive the control input from the pendant; and a display screen discrete from the pendant and configured to receive a display command from the interface box, wherein the display screen is disposed to allow the hoist operator to view a hoist load and the display screen simultaneously.

* * * * *